United States Patent Office 3,432,110
Patented Mar. 11, 1969

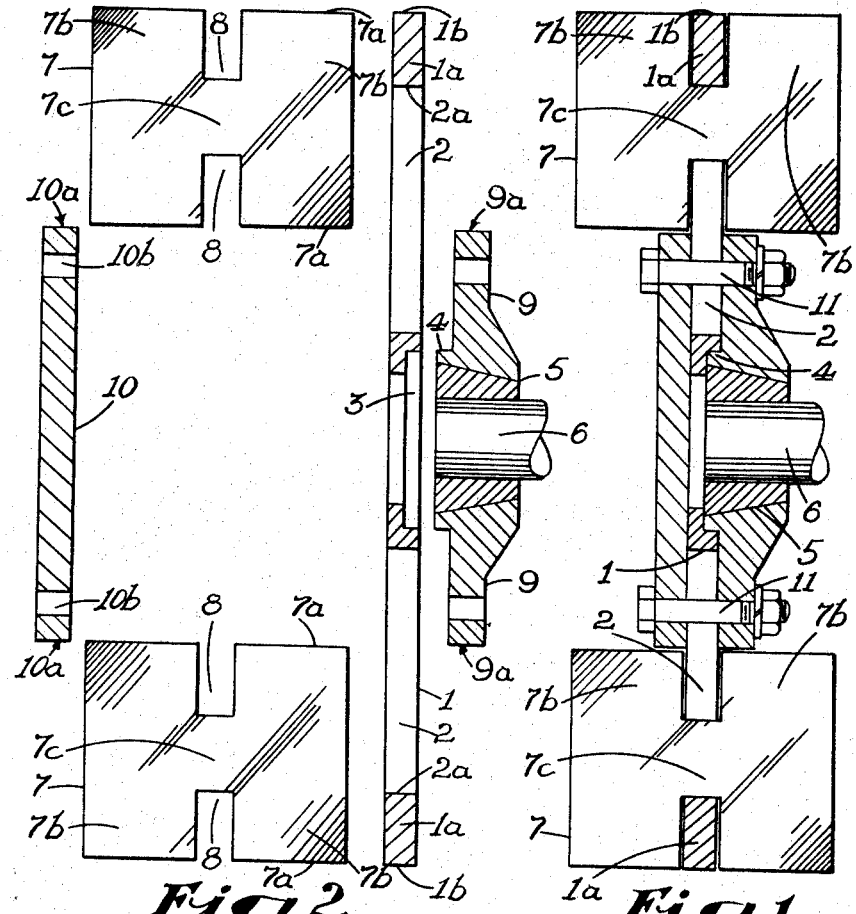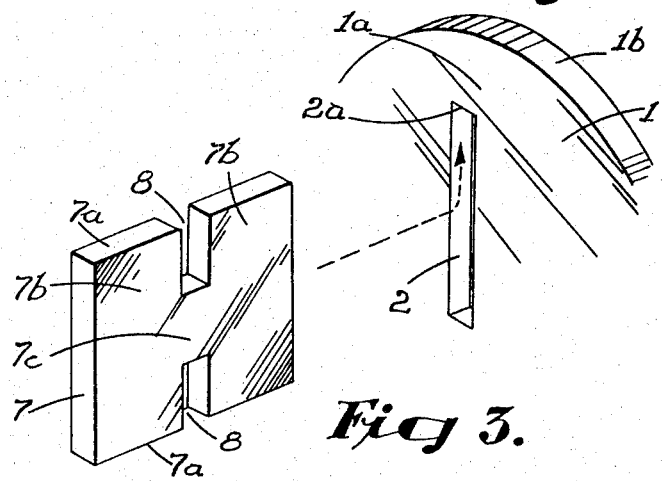

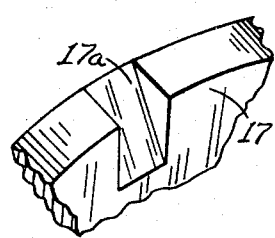
Fig 10.
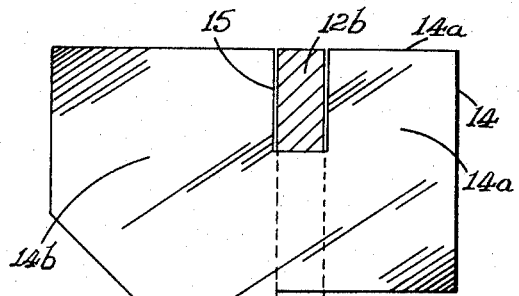
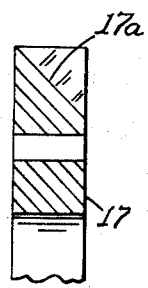
Fig 9.    Fig 8.
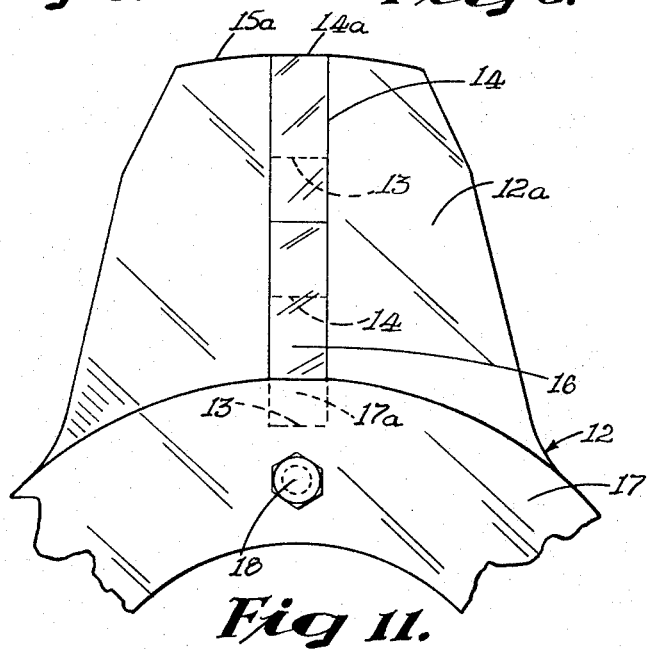
Fig 11.

3,432,110
MOUNTING OF BEATER AND LIKE
BLADES ON ROTORS
Ronald Frederick Bourne, Sandhurst, Johannesburg, Transvaal, Republic of South Africa (Wedgewood Gate, Sanddown, Johannesburg, Transvaal, Republic of South Africa), and Donald Gordon Cheyne, 47a 12th Ave., Parktown North, Johannesburg, Transvaal, Republic of South Africa
Filed July 19, 1966, Ser. No. 566,335
U.S. Cl. 241—191
Int. Cl. B02c 17/16
9 Claims

ABSTRACT OF THE DISCLOSURE

A rotor assembly, particularly suitable for hammer mills, impact and attrition mills, and like milling machinery, which comprises a rotor in the form of a plate which is mountable on a rotary shaft and which has a plurality of circumferentially spaced, radially disposed slots extending axially therethrough. A blade with an open slot in at least a radially outwardly disposable edge thereof, is provided for each plate slot. Each blade and the plate is interengageable by movement of the blade in its plate slot in an axial and a radial direction with respect to the plate to accommodate a portion of the blade in the plate slot and a portion of the rotor in the blade slot. A holding means retains each blade against disengaging movement out of its plate slot.

---

This invention relates to the mounting of beater and like blades on rotors.

It is common to employ rotors having beaters or the like mounted at their peripheries in hammer mills, impact and attrition mills, and like milling machinery. In some mills it is common to provide a rotor on which the beaters or hammers are anchored on special bracket means fast with the rotor peripheral zones. In these arrangements balancing is often necessary and very frequently the brackets and the beaters are of a cast character. Generally speaking, the component parts of the known arrangements are relatively complicated and expensive to produce and assemble.

An object of the present invention is to provide improved mounting of beater or like blades on a rotor which is believed will have useful advantages. The invention is directed to a rotor assembly and to certain individual components of such an assembly.

According to the invention, a rotor assembly is provided which includes a rotor; at least one slot in the rotor; a blade; an open slot in the blade, the blade and the rotor being interengageable by movement of the blade in the rotor slot in an axial and a radial direction with respect to the rotor to accommodate a portion of the blade in the rotor slot and a portion of the rotor in the blade slot; and means for holding the blade against disengaging movement out of the rotor slot.

The rotor may comprise a plate mountable on a rotary shaft and including a plurality of circumferentially spaced, radially disposed slots extending axially through the plate, a blade with an open slot being interengageable with the plate in each slot in the latter.

The or each slot in the rotor may be spaced radially inwardly from the outer periphery of the rotor, and the open slot in the or each blade may be in a radially outer edge thereof for accommodating a rotor zone disposed between the radially outer end of the associated rotor slot and the peripheral edge of the rotor.

The or each blade may include a substantially similar open slot in a radially inner edge thereof, either of the open slots in the or each blade being interengageable with the rotor whereby the or each blade is mountable in any one of a plurality of alternative dispositions relative to the rotor.

Alternatively, the radially inner edge of the or each blade may present a wedge shaped formation engageable by the holding means.

The holding means may include an end plate arranged to engage an inner zone of the or each blade.

The end plate may present a peripheral zone abutting portion of the radially inner edge of the or each blade.

Alternatively, the end plate may include one or more tapered slots each accommodating its own wedge-shaped formation on a blade.

Preferred embodiments of the invention will now be described by way of example with reference to the accompanying drawings in which:

FIGURE 1 is a diametrical sectional view of a first embodiment of mill rotor assembly according to the invention.

FIGURE 2 is an exploded view of the assembly of FIGURE 1.

FIGURE 3 is a fragmentary perspective view of the rotor plate and one of the blades of the assembly of FIGURE 1, illustrating the axial and radial movement of the blade for interengaging the blade and the rotor.

FIGURE 8 is a fragmentary diametrical sectional view of another embodiment of a mill rotor assembly according to the invention.

FIGURE 9 is a fragmentary diametrical sectional view of the holding end plate of the assembly of FIGURE 8.

FIGURE 10 is a fragmentary perspective view of the end plate of FIGURE 9.

FIGURE 11 is a fragmentary end elevational view of the assembly of FIGURE 8 in the direction of arrow M in FIGURE 8.

Figure 4:
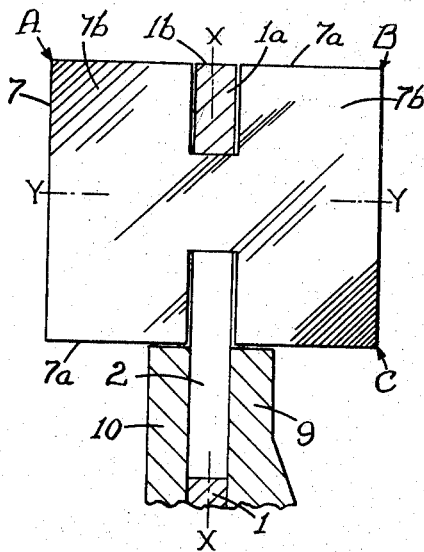
FIGURES 4 to 7 are fragmentary diametrical sectional views of the assembly of FIGURE 1, illustrating the mounting of a blade in alternative dispositions relative to the rotor.

Referring first to the embodiment of FIGURES 1 to 7, metal rotor plate 1 is provided with a plurality of circumferentially spaced, radially disposed slots 2 extending axially through rotor plate 1, which is bored centrally at 3 to enable it to fit snugly over shoulder 4 defined on hub member 5 which is, in turn, mountable on rotary drive shaft 6.

Each rotor slot 2 is provided with a blade 7 which presents a pair of similar, oppositely facing, radially disposed slots 8 in its extreme radial edges 7a to define a neck 7c. Each blade 7 is thus of H-shaped configuration, the principal limbs 7b of the H being of substantial width in an axial direction relative to the rotor. Both slots 8 in each blade 7 are dimensioned to accommodate a rotor zone 1a disposed between the radially outer end 2a of the associated rotor slot 2 and the peripheral edge 1b of rotor plate 1 and with the outer radial edge 7a of each blade 7 at the same or a greater radius than the radius of the peripheral edge 1b of rotor plate 1.

The radial dimensions of blades 7 are less than those of rotor slots 2 so that blades 7 can pass into rotor slots 2 in an axial direction relative to the rotor.

In mounting blades 7 on rotor disc 1, each blade 7 is first moved axially relative to rotor plate 1 into the associated rotor slot 2 align the blade slots 8 with the rotor plate 1, before the latter is located on hub 5. Blades 7 are then moved radially outwardly to interengage rotorplate 1 and blades 7, thereby to accommodate rotor zones 1a in blade slots 8 and to accommodate blade necks 7c in rotor slots 2.

The axial and radial movement of blades 7 in rotor slots 2 which is required to interengage blades 7 and rotor plate 1 is shown clearly by FIGURE 3.

After interengagement between blades 7 and rotor plate 1, the latter is located on hub 5 to abut against end plate 9 which is presented by hub 9 and which has a peripheral surface 9a adapted to lie in abutting relationship to inner peripheral edge 7a of blades 7.

In order to lock blades 7 and rotor plate 1 firmly in interengaging relationship, end plate 10 is provided to abut against rotor plate 1 on the side remote from hub member 5 so that in effect rotor plate 1 is sandwiched between end plates 9 and 10. The outer diameter of end plate 10 is similar to that of end plate 9 on hub 5, end plate 10 presenting a peripheral surface 10a adapted to lie in abutting relationship to the inner peripheral edges 7a of blades 7 on the side of rotor plate 1 opposite to hub 5.

Bolts 11 engaging both end plates 9 and 10 and passing through rotor slots 2 serve to anchor the various elements together.

No axial movement of blades 7 is possible because of fact that rotor zone 1a between circumferential edge 1b of rotor plate 1 and outer ends 2a of rotor slots 2 are snugly accommodated between the flanking limbs 7b of blades 7. Furthermore, end plates 9 and 10 prevent radially inward movement of blades 7 so that is is impossible for blades 7 to move into positions in which flanking limbs 7b of blades 7 clear rotor zones 1a to permit axial withdrawal of blades 7 from rotor slots 2. Blades 7 are therefore held against disengaging movement out of rotor slots 2.

The arrangement described above has numerous useful advantages. Fabrication of the various elements is a simple matter and in some cases fabrication may be accomplished merely by a flame cutting process off a template. This is certainly true of blades 7. The structure of the assembly is such that the elements employed may be produced inexpensively and replacement through wear is simple. For example, end plate 10 is nothing more than a piece of metal cut out to provide a circumferential surface 10a for engagement with the inner edges 7a of blades 7 and having holes 10b for the accommodation of anchoring bolts 11.

By providing a suitable number of regularly spaced slots 2 in rotor plate 1 and mounting in the slots substantially identical blades 7 which are all made off the same template, special balancing of the rotor will not normally be required since the assembly would be substantially in balance.

Figure 5:
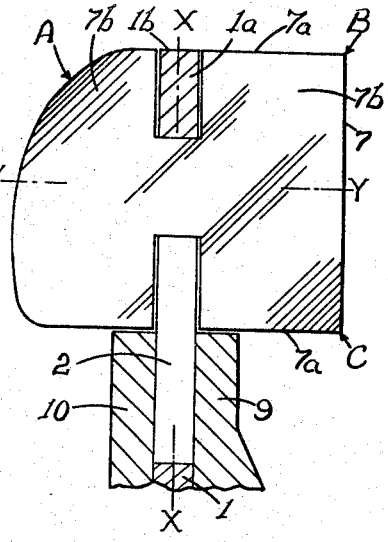
Figure 7:
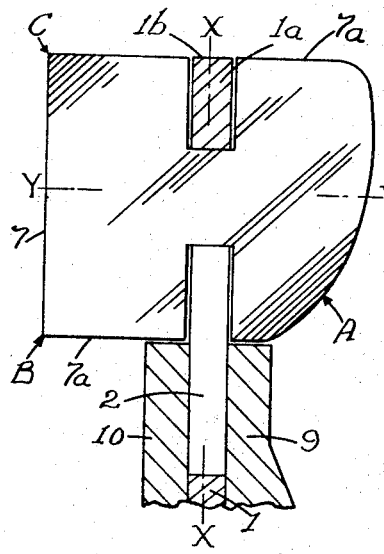
Figure 6:
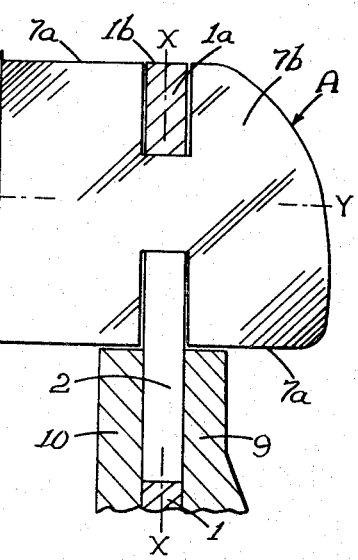

Blades 7 themselves offer useful advantages quite apart from the ease with which they can be made. The provision of a pair of similar, oppositely facing slot 8 makes a blade 7 reversible in a double sense as illustrated in FIGURES 4 to 7. FIGURE 4 shows a new blade 7 mounted in the disposition shown in FIGURE 1 in which corner A is exposed to wear. FIGURE 5 shows the same blade in the same position but after it has been worn away in corner zone A. FIGURE 6 shows the blade 7 of FIGURE 5 turned about its axis X—X to a disposition in which corner B is exposed to wear. The same slot 8 in the blade 7 accommodates rotor zone 1a in both the dispositions shown in FIGURES 5 and 6. FIGURE 7 shows the blade 7 turned about its axis Y—Y from the disposition of FIGURE 6 so that the other slot 8 accommodates rotor zone 1a and corner C is exposed to wear. It will be clear from the above that either of slots 8 in each blade 7 is interengageable with rotor plate 1 whereby each blade 7 is mountable in any one of a plurality of alternative dispositions relative to rotor plate 1.

It will be appreciated that many variations in detail are possible without departing from the scope of the invention. For example, the shape of rotor plate 1, which is often referred to in the art as a "center plate," is by no means confined to the shape of a disc or ring as illustrated in FIGURES 1 to 7. It could take numerous different shapes while still presenting a plurality of blade accommodating slots, such as 2. Thus, the rotor plate may be in the nature of arms projecting from a central boss, blade accommodating slots being provided in the arms. Also, holding end plate 10 may be in the form of a ring.

Referring now to FIGURES 8 to 11, rotor plate 12 presents a plurality of circumferentially spaced arms 12a projecting radially from a central boss and each provided with a slot 13 accommodating a blade 14 in similar manner to that described above. However, it will be seen that blades 14 are not symmetrical and are not provided with pairs of oppositely facing, rotor accommodating slots. Instead, each blade 14 presents only one open, rotor accommodating slot 15 in its outer radial edge 14a. The interengagement between blades 14 and rotor plate 12 is achieved by axial and radial movement of blades 14 in rotor slots 13 in a manner similar to that described above with reference to FIGURE 3. However, it will be noticed that it is only blade portion 14a having a radial dimension less than that of a rotor slot 13, that can enter a rotor slot 13, blade portion 14b being too large radially to enter rotor slot 13.

The radially inner edge zone of each blade portion 14b presents a wedge shaped formation 16 which converges in a radially inward direction and whose tip is accommodated in a mating slot 17a in the periphery of end plate 17 so that as end plate 17 is drawn up axially towards rotor plate 12 by bolts 18, blades 14 are urged radially outwardly against peripheral zone 12b of rotor plate 12.

Axial movement of blades 14 relative to rotor plate 12 is prevented, in similar manner as before, by the flanking blade portions 14a and 14b. Radial movement of blades 14 relative to rotor plate 12 is prevented by end plate 17 so that blades 14 are held against disengaging movement out of rotor slots 13.

It will be appreciated that end plate 17 presents a tapered slot 17a for the wedge shaped formation 16 of each blade 14.

It will be seen that in this embodiment a hub or a part on a hub is not employed for the purpose of holding blades 14 in position.

As in the case of the first embodiment described above, many variations in detail are possible without departing from the scope of the invention. For example, rotor plate 12 may be of any suitable configuration. Also, instead of formations 16 on blades 14 being wedge shaped they may be of regular section in a radial direction and accommodated in mating slots in end plate 17 to hold blades 14 against disengaging movement out of rotor slots 13. In this case, blades 14 will merely be retained without being urged radially outwardly as in the case of wedge shaped formations 16.

An arrangement such as that of the second embodiment illustrated in FIGURES 8 to 11, is particularly suitable for use in mills of the kind in which the blades act as beaters with material to be milled passing into a rotor chamber on the end plate side of the rotor and then moving axially past the tip of the rotor to a classifying stage. In the classifying stage a classifying assembly is defined from which material may be rejected for further milling by the blade zones projecting from the rotor into the classifying section.

We claim:
1. A rotor assembly comprising a rotor including a plate mountable on a rotary shaft, said plate having a plurality of circumferentially spaced, radially disposed slots extending axially through the plate; a blade for each slot in the plate, each blade having an open slot, each blade and the plate being interengageable by movement of the blade in its plate slot in an axial and a radial direction with respect to the plate to accommodate a portion of the blade in the plate slot and a portion of the rotor in the blade slot; and means for holding each blade against disengaging movement out of its plate slot.

2. A rotor assembly as claimed in claim 1, wherein the holding means includes an end plate presenting a peripheral zone arranged to abut a portion of the radially inner edge of the blade.

3. A rotor assembly as claimed in claim 1, wherein the slots in the plate are spaced radially inwardly from the outer periphery of the plate, and wherein the open slot in each blade is in a radially outer edge of the blade for accommodating a region of the plate disposed between the radially outer end of the associated plate slot and the peripheral edge of the plate.

4. A rotor assembly as claimed in claim 3, wherein each blade includes a substantially similar open slot in a radially inner edge thereof, either of the open slots in the blade being interengageable with the plate whereby the blade is mountable in any one of a plurality of alternative dispositions relative to the plate.

5. A rotor assembly as claimed in claim 3, wherein the radially inner edge of a blade presents a wedge shaped formation engageable by the holding means.

6. A rotor assembly as claimed in claim 5, wherein the holding means comprises an end plate including at least one tapered slot arranged to accommodate the wedge formation on the blade.

7. A rotor comprising a plate mountable on a rotary shaft and including a plurality of circumferentially spaced, radially disposed slots extending axially through the plate, a blade with an open slot therein being interengageable with the plate in each slot in the latter by movement of the blade in the rotor slot in an axial and a radial direction with respect to the rotor to accommodate a portion of the blade in the rotor slot and a portion of the rotor in the blade slot.

8. A rotor blade having a pair of substantially similar, oppositely facing, open slots in a pair of opposite, radially outwardly and inwardly disposable edges, either of the open slots in the blade being interengageable with a rotor by movement of the blade in a slot in the rotor in an axial and a radial direction with respect to the rotor to accommodate a portion of the blade in the rotor slot and a portion of the rotor in the blade slot, whereby the blade is mountable in any one of a plurality of alternative dispositions relative to the rotor.

9. A rotor blade as claimed in claim 8, wherein the radially inwardly disposable edge of the blade presents a wedge-shaped formation engageable in a tapered slot in holding means.

References Cited
UNITED STATES PATENTS 1,977,501 10/1934 Townsend.
2,709,047 5/1955 Charlton _____ 241—197

FOREIGN PATENTS 81,434 5/1895 Germany.
977,192 12/1964 Great Britain.

ANDREW R. JUHASZ, *Primary Examiner.*

F. T. YOST, *Assistant Examiner.*